US010829926B2

United States Patent
Adachi

(10) Patent No.: US 10,829,926 B2
(45) Date of Patent: Nov. 10, 2020

(54) METAL JOINT AND PANEL JOINING METHOD

(71) Applicant: SHELTER CO., LTD., Yamagata (JP)

(72) Inventor: Hiroyuki Adachi, Yamagata (JP)

(73) Assignee: SHELTER CO., LTD. (JP)

(*) Notice: Subject to any disclaimer, the term of this patent is extended or adjusted under 35 U.S.C. 154(b) by 0 days.

(21) Appl. No.: 16/341,653

(22) PCT Filed: Oct. 17, 2017

(86) PCT No.: PCT/JP2017/037584
§ 371 (c)(1),
(2) Date: Apr. 12, 2019

(87) PCT Pub. No.: WO2018/074483
PCT Pub. Date: Apr. 26, 2018

(65) Prior Publication Data
US 2019/0368188 A1 Dec. 5, 2019

(30) Foreign Application Priority Data

Oct. 18, 2016 (JP) .................. 2016-204717

(51) Int. Cl.
*E04B 1/26* (2006.01)
*E04B 1/58* (2006.01)
(Continued)

(52) U.S. Cl.
CPC .................. *E04B 1/26* (2013.01); *E04B 1/58* (2013.01); *E04C 3/18* (2013.01); *E04B 2/707* (2013.01);
(Continued)

(58) Field of Classification Search
CPC ...... E04B 1/26; E04B 1/48; E04B 2001/2648; E04B 2001/2644; E04B 2/707; E04C 3/18
See application file for complete search history.

(56) References Cited

U.S. PATENT DOCUMENTS 6,212,849 B1 * 4/2001 Pellock .................... E04B 1/26
52/167.3
6,240,695 B1 * 6/2001 Karalic .................... E04C 3/02
52/656.1
(Continued)

FOREIGN PATENT DOCUMENTS

EP     0284494 A1    9/1988
EP     0651100 A2    5/1995
(Continued)

OTHER PUBLICATIONS

International Preliminary Report on Patentability for Application No. PCT/JP2017/037584 dated May 2, 2019, 11 pages.
(Continued)

*Primary Examiner* — Christine T Cajilig

(57) ABSTRACT

A metal joint for joining, to a frame built by appropriately combining a horizontal structural member and a vertical structural member, a rectangular panel fitted into the frame includes a base member made of a rectangular metal plate, and cylindrical members which are each made of a metal cylinder, and are fixed onto opposite surfaces of the base member. The base member is adapted to be disposed between the frame and the panel. The cylindrical members are adapted to be fitted into circular holes formed in the frame and the panel.

7 Claims, 14 Drawing Sheets

(51) Int. Cl.
*E04B 2/70* (2006.01)
*E04C 3/18* (2006.01)
*F16B 5/00* (2006.01)

(52) U.S. Cl.
CPC ......... *E04B 2001/2644* (2013.01); *F16B 5/00* (2013.01)

(56) References Cited

U.S. PATENT DOCUMENTS

| | | | | |
|---|---|---|---|---|
| 6,298,612 | B1* | 10/2001 | Adams | E04B 1/26 52/167.3 |
| 7,506,479 | B2* | 3/2009 | Pryor | E04B 2/707 52/293.3 |
| 8,117,788 | B1* | 2/2012 | Mueller | E04H 9/02 52/1 |
| 8,397,454 | B2* | 3/2013 | Commins | E04B 1/26 52/293.3 |
| 2003/0041551 | A1* | 3/2003 | Boone | E04B 1/26 52/698 |
| 2003/0167711 | A1* | 9/2003 | Lstiburek | E04B 1/26 52/223.4 |
| 2006/0144008 | A1* | 7/2006 | Fouch | E04B 1/26 52/292 |
| 2007/0028542 | A1* | 2/2007 | Lafferty, III | E04B 1/26 52/293.3 |
| 2014/0090315 | A1* | 4/2014 | Imai | E04B 1/49 52/167.1 |
| 2016/0258161 | A1* | 9/2016 | Imai | E04B 1/38 |

FOREIGN PATENT DOCUMENTS

| | | | | |
|---|---|---|---|---|
| FR | 2584461 | A1 * | 1/1987 | ............... E04B 1/26 |
| JP | H108159121 | A | 6/1996 | |
| JP | 2001123530 | A | 5/2001 | |
| JP | 2003328453 | A | 11/2003 | |
| JP | 2004137774 | A | 5/2004 | |
| JP | 2005098036 | A | 4/2005 | |
| JP | 2005105754 | A | 4/2005 | |
| JP | 2007284867 | A | 11/2007 | |
| JP | 2008255627 | A | 10/2008 | |
| JP | 2008255658 | A | 10/2008 | |
| JP | 2012026147 | A | 2/2012 | |
| JP | 2012057447 | A | 3/2012 | |
| JP | 2014047600 | A | 3/2014 | |
| WO | WO-2006006323 | A1 * | 1/2006 | ............... E04B 1/26 |

OTHER PUBLICATIONS

Japanese Decision of Rejection dated Dec. 26, 2017 in JP Appln No. 2016-204717.
Japanese Office Action dated Nov. 20, 2018 in JP Appln No. 2018-047843.
Japanese Office Action dated Nov. 20, 2018 in JP Appln No. 2018-047844.
Japanese Office Action dated Sep. 19, 2017 in JP Appln No. 2016-204717.
Chinese Office Action for Application No. 201780061937.1 dated Jun. 1, 2020, 9 pages.
Extended European Search Report with Written Opinion for Application No. 17861738.7 dated May 29, 2020, 7 pages.

* cited by examiner

METAL JOINT AND PANEL JOINING METHOD

CROSS-REFERENCE TO RELATED APPLICATIONS

The present application is a national phase entry under 35 U.S.C. § 371 of International Application No. PCT/JP2017/037584, filed Oct. 17, 2017, published in Japanese, which claims priority from Japanese Patent Application No. 2016-204717, filed on Oct. 18, 2016, the disclosures of which are hereby incorporated herein by reference.

TECHNICAL FIELD

The present invention relates to a metal joint and to a panel joining method.

BACKGROUND ART

In timber frame construction methods, gate-shaped and/or rectangular frames are built on a concrete foundation by appropriately combining horizontal structural members, such as groundsills and beams, and vertical structural members, such as posts. When, for example, a horizontal force due to an earthquake, a typhoon, or the like acts on such a frame, the frame tends to deform into a parallelogram. To suppress such a deformation, a brace is used to connect each pair of diagonally opposite corners of the frame, as disclosed in JP 2012-57447 A (Patent Document 1).

REFERENCE DOCUMENT LIST

Patent Document

Patent Document 1: JP 2012-57447 A

SUMMARY OF THE INVENTION

Problem to be Solved by the Invention

Here, to respond to a variety of building needs, it may be conceivable to use an alternative measure to suppress such a deformation of a gate-shaped or rectangular frame into a parallelogram. Specifically, in place of a brace, a panel made of laminated veneer lumber (LVL), cross laminated timber (CLT) or the like may be used and fitted into the frame. In this case, in order to facilitate designing a gate-shaped or rectangular frame having a sufficient load-bearing capacity, it is desirable to use metal joints not only capable of resisting horizontal forces due to earthquakes, typhoons, and the like, and but also capable of blocking load transfer from the frame to the panel. However, there has been no metal joint that satisfies such needs, and there has been no choice but to use metal joints that firmly join a panel to a frame.

Therefore, the present invention has been made to provide a metal joint and a panel joining method that are capable of blocking load transfer to a panel from a frame built by combining horizontal and vertical structural members.

Means for Solving the Problem

To this end, a metal joint for joining, to a frame built by appropriately combining a horizontal structural member and a vertical structural member, a rectangular panel fitted into the frame includes a base member made of a rectangular metal plate, and cylindrical members which are each made of a metal cylinder, and are fixed onto opposite surfaces of the base member. The base member is adapted to be disposed between the frame and the panel. The cylindrical members are adapted to be fitted into circular holes formed in the frame and the panel.

Furthermore, another metal joint for joining, to a frame built by appropriately combining a horizontal structural member and a vertical structural member, a rectangular panel fitted into the frame includes a base member made of a rectangular metal plate, a cylindrical member made of a metal cylinder and fixed onto one surface of the base member, and a joining member made of a rectangular metal plate and fixed onto the other surface of the base member. The base member is adapted to be disposed between the frame and the panel. The cylindrical member is adapted to be fitted into a circular hole formed in either one of the frame and the panel. The joining member is adapted to be fitted into a slit formed in the other of the frame and the panel.

Furthermore, a metal joint for joining, to a frame built on a concrete foundation by appropriately combining a horizontal structural member and a vertical structural member, a rectangular panel fitted into the frame includes a metal fixing member adapted to be fastened to the concrete foundation, and a cylindrical member made of a metal cylinder and fixed onto the upper surface of the fixing member. At least an upper surface of the metal fixing member is rectangular and flat so as to form a horizontal surface when the fixing member is fastened to the concrete foundation. The cylindrical member is adapted to be fitted into a circular hole formed in the panel.

Effects of the Invention

The present invention allows blocking load transfer to a panel from a frame built by combining horizontal and vertical structural members.

MODES FOR CARRYING OUT THE INVENTION

Embodiments for implementing the present invention will be described in detail below with reference to the accompanying drawings.

In timber frame construction methods, gate-shaped and/or rectangular frames are built by appropriately combining horizontal and vertical wooden structural members as wooden building components. Various metal fittings as described below are used to build these frames. Note that each of the horizontal and vertical structural members may be made of either solid wood or laminated wood.

1. Metal Vertical-Member Joint

Figure 1:
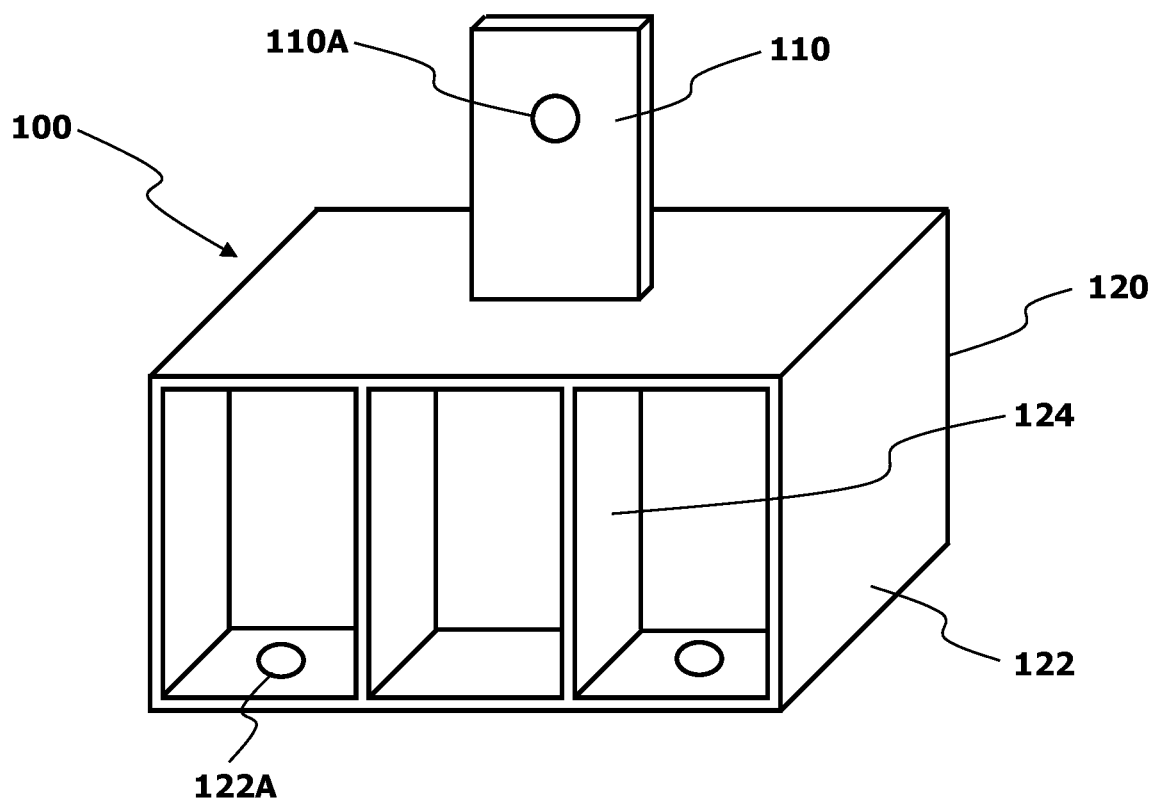
FIG. 1 is a perspective view of an example of a metal vertical-member joint.

As shown in FIG. 1, a metal vertical-member joint 100 has a joining member 110 made of a rectangular metal plate, and a fixing member 120 formed by appropriately joining rectangular metal plates. The joining member 110, which is adapted to be fitted into a slit formed in the lower surface of a post, has a through hole 110A adapted to receive the shank of a drift pin therethrough. The fixing member 120, which is adapted to be fastened to a concrete foundation with anchor bolts, has a box-shaped first member 122 having two opposite open faces, and a second member 124 disposed in the internal space of the first member 122 so as to reinforce the first member 122.

As used herein, the terms "rectangular" and "box-shaped" refer to a substantially and seemingly rectangular shape and a substantially and seemingly box shape, respectively. Thus, each of rectangular members and box-shaped members herein may have one or more notches, small holes and/or the like. The same applies to other shape-related terms herein.

The bottom plate of the first member 122 has a plurality of through holes 122A for receiving the shanks of anchor bolts projecting from a concrete foundation therethrough. In the example shown in FIG. 1, the bottom plate of the first member 122 has four through holes 122A arranged in a matrix with two rows extending in the longitudinal direction of the internal space of the first member 122 and two columns extending perpendicular to the longitudinal direction of the internal space. Note, however, that any number of through holes 122A may be formed at any locations in the bottom plate of the first member 122. The second member 124, which has a lattice structure formed by combining rectangular metal plates, is fixedly joined onto the inner surfaces of the first member 122 by welding or the like. The lower end of the joining member 110 is fixedly joined onto the upper surface of the fixing member 120 by welding or the like. Specifically, the joining member 110 is fixed so that its plate surface and a transverse cross section of the first member 122 lie in the same plane. The detailed dimensions, sizes and the like of the metal vertical-member joint 100 may be appropriately determined according to, for example, where to use the metal vertical-member joint 100 and what components are to be joined together using the metal vertical-member joint 100 (the same applies to other fittings below).

2. Metal Connector

Figure 2:
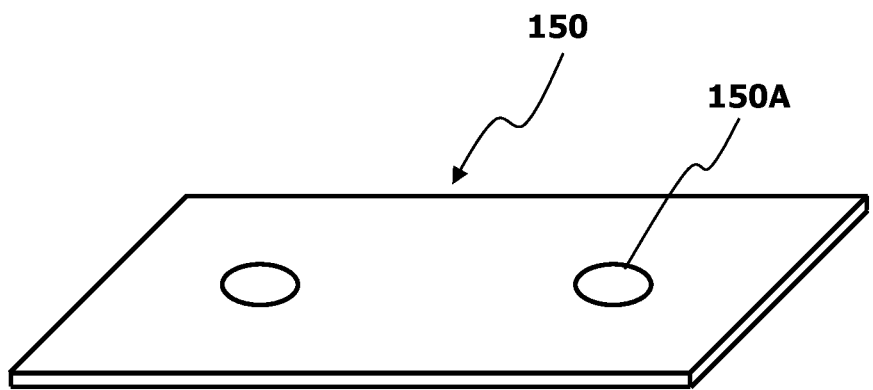
FIG. 2 is a perspective view of an example of a metal connector.

As shown in FIG. 2, a metal connector 150 is made of a rectangular metal plate, and through holes 150A for receiving shanks of drift pins therethrough are formed near the opposite longitudinal ends of the metal connector 150. The metal connector 150 is adapted to be fitted into slits formed respectively in a horizontal structural member and a vertical structural member and join these horizontal and vertical structural members together.

3. Metal Tie-Down Strap

Figure 3:
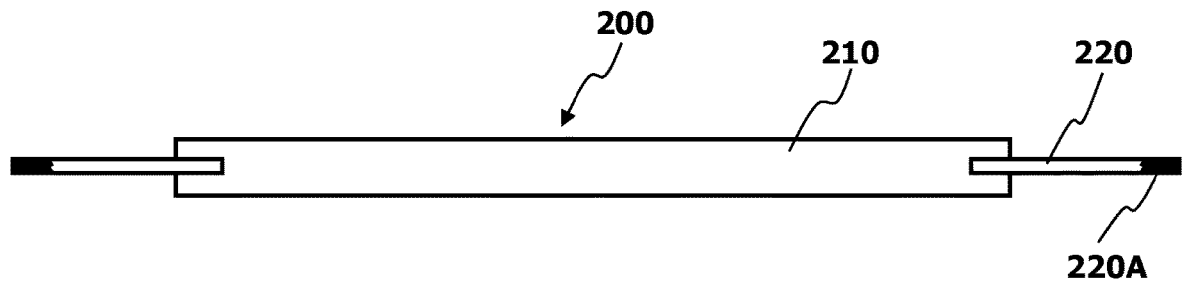
FIG. 3 is a plan view of an example of a metal tie-down strap.
Figure 4:
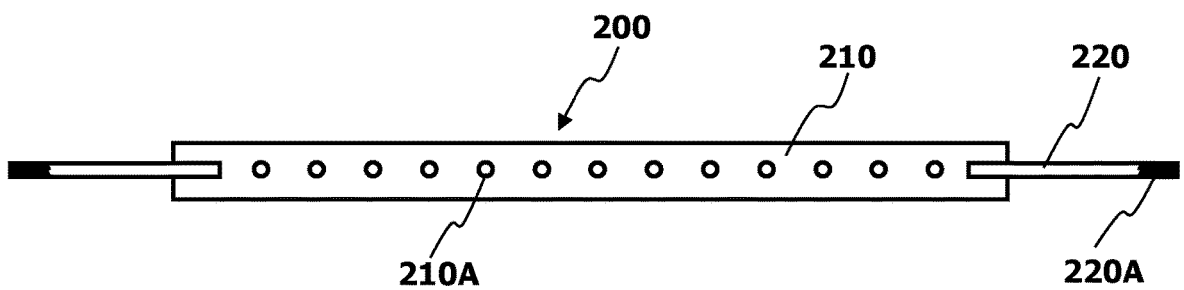
FIG. 4 is a plan view of a modified example of the metal tie-down strap.

As shown in FIG. 3, a metal tie-down strap 200 includes a base member 210, bolt members 220, and fasteners (not shown). The base member 210 is made of a metal plate having a long rectangular shape in a plan view. The bolt members 220 are metal members extending outward in the longitudinal direction of the base member 210 from the opposite longitudinal ends thereof. The base end of each bolt member 220 is fixedly joined to the base member 210 by welding or the like, and an external thread 220A is formed at least on the outer periphery of a distal end portion of the bolt member 220. In addition, as shown in FIG. 4, a plurality of through holes 210A each adapted to receive the shank of a drift pin therethrough may be formed in the plate surface of the base member 210. The fasteners, each of which includes a flat washer, a spring washer, and a double nut, are adapted to be detachably screwed onto the external threads 220A of the bolt members 220. As will be described in detail later, the metal tie-down strap 200 is adapted to be fitted into a slit of a panel or a post, which serves as a vertical structural member.

When the metal tie-down strap 200 is not required to be fitted into a slit of a panel or a post, which serves as a vertical structural member, the base member 210 may have any cross-sectional shape, such as a square, circular, or triangular cross-sectional shape.

4. Metal Box-Shaped Fitting

Figure 5:
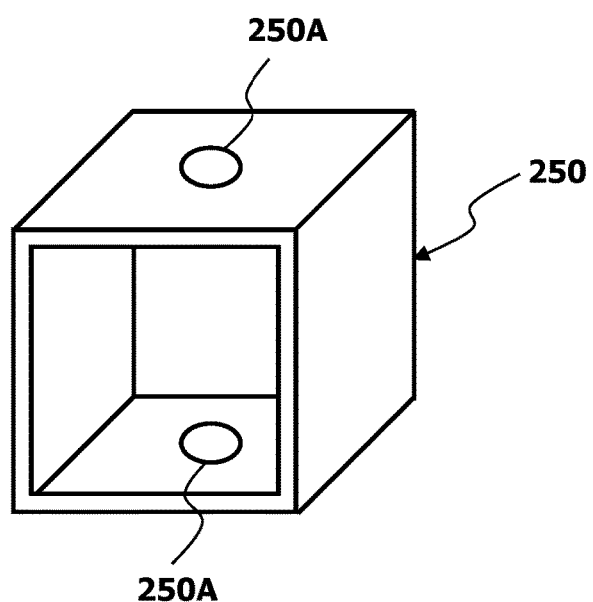
FIG. 5 is a perspective view of an example of a metal box-shaped fitting.

A metal box-shaped fitting 250, which is formed by appropriately joining rectangular metal plates, has a box shape with a single open face as shown in FIG. 5. The metal box-shaped fitting 250 has through holes 250A in two opposite faces adjacent to the open face. Each through hole 250A is adapted to receive the shank of an anchor bolt projecting from a concrete foundation or the shank of one of the bolt members 220 of the metal tie-down strap 200 therethrough.

Figure 6:
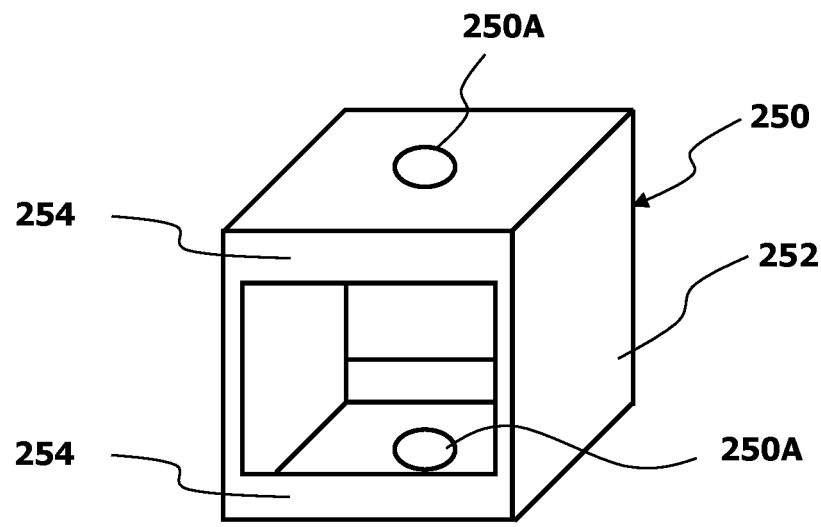
FIG. 6 is a perspective view of a modified example of the metal box-shaped fitting.

Alternatively, as shown in FIG. 6, the metal box-shaped fitting 250 may have a box-shaped first member 252 and rectangular second members 254. The first member 252, which is formed by appropriately joining rectangular metal plates, has two opposite open faces. The second members 254 close upper and lower portions of the open faces of the first member 252 to reinforce the first member 252. The metal box-shaped fitting 250 of FIG. 6 has through holes 250A formed in the top and bottom plates of the first member 252. Each through hole 250A is adapted to receive the shank of an anchor bolt projecting from a concrete foundation or the shank of one of the bolt members 220 of the metal tie-down strap 200 therethrough.

5. Metal Spacer

Figure 7:
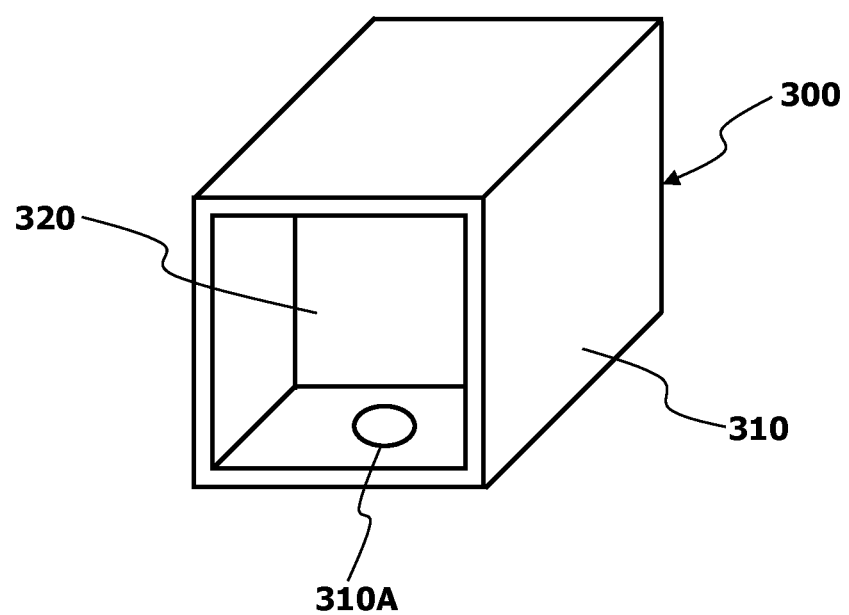
FIG. 7 is a perspective view of an example of a metal spacer.

A metal spacer 300 is adapted to be used in conjunction with the metal box-shaped fitting 250 to join a vertical structural member integrally provided with the metal tie-down strap 200 to a concrete foundation. As shown in FIG. 7, the metal spacer 300 includes a first member 310 and a second member 320. The first member 310, which is formed by appropriately joining rectangular metal plates, has a box shape with two opposite open faces. The second member 320, which is made of a rectangular metal plate, is disposed so that its plate surface and a transverse cross section of the internal space of the first member 310 lie in the same plane. In the bottom plate of the first member 310, two through holes 310A are formed in a row extending in the longitudinal direction of the internal space of the first member 310. Each through hole 310A is adapted to receive the shank of an anchor bolt projecting from a concrete foundation. Note, however, that the number of through holes 310A formed in the bottom plate of the first member 310 is not limited to two, but may be any number. The second member 320 is disposed at a location that evenly divides the internal space of the first member 310 into two parts, and fixedly joined onto the inner surfaces of the first member 310 by welding or the like.

6. First Metal Shear Fitting

Figure 8:
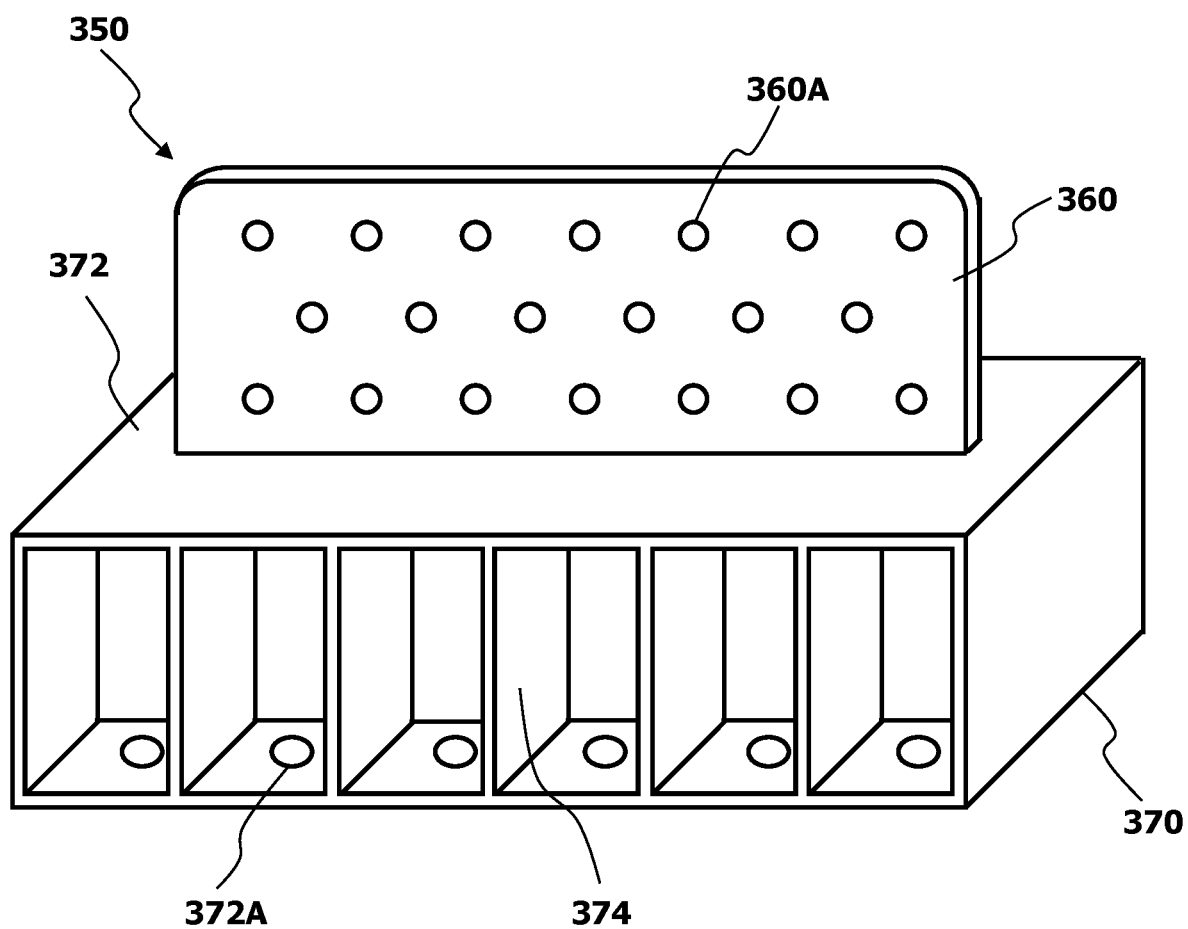
FIG. 8 is a perspective view of an example of a first metal shear fitting.

As shown in FIG. 8, a first metal shear fitting 350 has a joining member 360 made of a rectangular metal plate, and a fixing member 370 formed by appropriately joining rectangular metal plates. The joining member 360 is adapted to be fitted into a slit formed in a panel, and has a plurality of through holes 360A each adapted to receive the shank of a drift pin therethrough. In the example shown in FIG. 8, the through holes 360A are formed in a staggered pattern of three rows extending in the longitudinal direction of the joining member 360. Note, however, that any number of through holes 360A may be formed at any locations in the joining member 360. The fixing member 370, which is adapted to be fastened to a concrete foundation with anchor bolts, has a box-shaped first member 372 having two opposite open faces, and a second member 374 disposed in the internal space of the first member 372 so as to reinforce the first member 372.

In the bottom plate of the first member 372, a plurality of through holes 372A are formed. Each through hole 372A is adapted to receive the shank of an anchor bolt projecting from a concrete foundation. In the example shown in FIG. 8, the bottom plate of the first member 372 has twelve through holes 372A arranged in a matrix with two rows extending in the longitudinal direction of the internal space of the first member 372 and six columns extending perpendicular to the longitudinal direction of the internal space. Note, however, that any number of through holes 372A may be formed at any locations in the bottom plate of the first member 372. The second member 374 has a lattice structure formed by combining rectangular metal plates so as to surround each through hole 372A of the first member 372 from three sides orthogonal to each other, and is fixedly joined onto the inner surfaces of the first member 372 by welding or the like. The lower end of the joining member 360 is fixedly joined onto the upper surface of the fixing member 370 by welding or the like. Specifically, the joining member 360 is fixedly joined so that its plate surface and a transverse cross section of the first member 372 lie in the same plane.

7. Second Metal Shear Fitting

Figure 9:
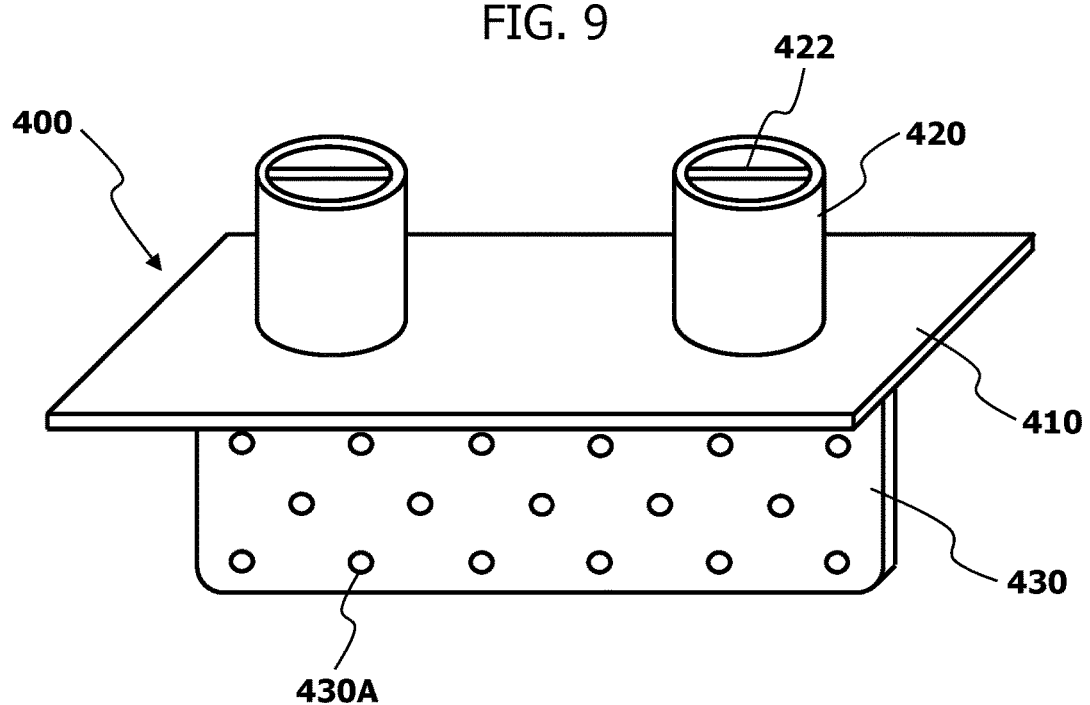
FIG. 9 is a perspective view of an example of a second metal shear fitting.

As shown in FIG. 9, a second metal shear fitting 400 has a base member 410 made of a rectangular metal plate, two cylindrical members 420 each made of a metal cylinder, and a joining member 430 made of a rectangular metal plate. Note that the second metal shear fitting 400 may be an example of a metal joint.

The base member 410 is adapted to be disposed between a frame and a panel. Each cylindrical member 420 is adapted to be fitted into a circular hole formed in a groundsill, a beam, or a panel. The cylindrical members 420 are fixedly joined (fixed) onto one surface of the base member 410, by welding or the like, at two positions spaced apart from each other in the longitudinal direction of the base member 410. More specifically, each cylindrical member 420 is fixedly joined at a location that evenly divides the length, perpendicular to the longitudinal direction of the base member 410, of the plate surface of the base member 410 into two. In order to improve the strength of each cylindrical member 420, a reinforcing member 422 made of a rectangular metal plate may be fixedly joined to the inner periphery of the cylindrical member 420 by welding or the like, and integrated with the cylindrical member 420. The number of cylindrical members 420 fixedly joined to the one surface of the base member 410 is not limited to two, and may be one, three, or more.

The joining member 430, which is adapted to be fitted into a slit formed in a groundsill, a beam, or a panel, has a plurality of through holes 430A each adapted to receive the shank of a drift pin therethrough. In the example shown in FIG. 9, the through holes 430A are formed in a staggered pattern of three rows extending in the longitudinal direction of the joining member 430. Note, however, that any number of through holes 430A may be formed at any locations in the joining member 430. The joining member 430 is fixedly joined (fixed) onto the other surface of the base member 410, by welding or the like, so as to extend in the longitudinal direction of the base member 410 and project perpendicularly to the base member 410.

8. Third Metal Shear Fitting

Figure 10:
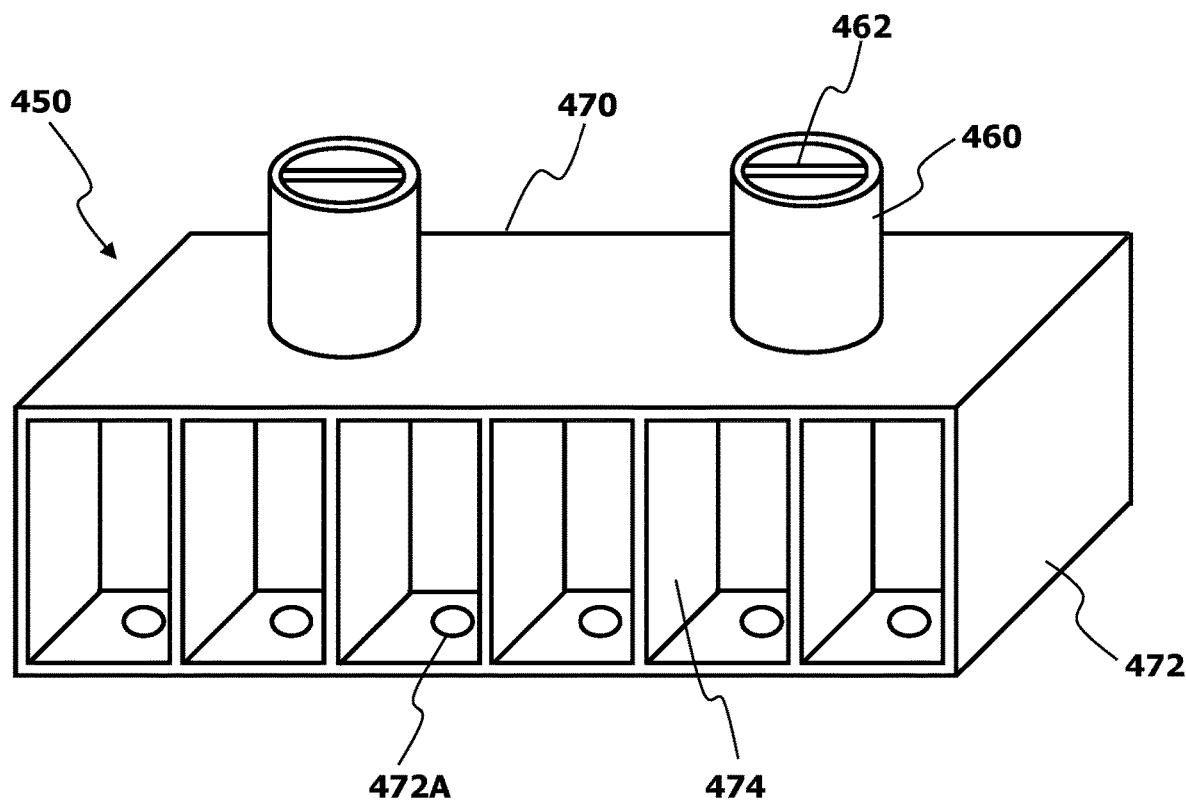
FIG. 10 is a perspective view of an example of a third metal shear fitting.

As shown in FIG. 10, a third metal shear fitting 450 has two cylindrical members 460 each made of a metal cylinder, and a fixing member 470 formed by appropriately joining rectangular metal plates. Note that the third metal shear fitting 450 may be an example of the metal joint.

Each cylindrical member 460 is adapted to be fitted into a circular hole formed in a panel. The cylindrical members 460 are fixedly joined (fixed) onto the upper surface of the fixing member 470, by welding or the like, at two positions spaced apart from each other in the longitudinal direction of the fixing member 470. More specifically, each cylindrical member 460 is fixedly joined at a location that evenly divides the length, perpendicular to the longitudinal direction of the fixing member 470, of the upper surface of the fixing member 470 into two. In order to improve the strength of each cylindrical member 460, a reinforcing member 462 made of a rectangular metal plate may be fixedly joined to the inner periphery of the cylindrical member 460 by welding or the like, and integrated with the cylindrical member 460. The number of cylindrical members 460 fixedly joined to the upper surface of the fixing member 470 is not limited to two, and may be one, three, or more.

The fixing member 470, which is adapted to be fastened to a concrete foundation with anchor bolts, has a box-shaped first member 472 having two opposite open faces, and a second member 474 disposed in the internal space of the first member 472 so as to reinforce the first member 472. The bottom plate of the first member 472 has a plurality of through holes 472A each adapted to receive the shank of an anchor bolt projecting from a concrete foundation therethrough. In the example shown in FIG. 10, the bottom plate of the first member 472 has twelve through holes 472A arranged in a matrix with two rows extending in the longitudinal direction of the internal space of the first member 472 and six columns extending perpendicular to the longitudinal direction of the internal space. Note, however, that any number of through holes 472A may be formed at any locations in the bottom plate of the first member 472. The second member 474, which has a lattice structure formed by combining rectangular metal plates so as to surround each through hole 472A of the first member 472 from three sides orthogonal to each other, is fixedly joined onto the inner surfaces of the first member 472 by welding or the like.

Note that the fixing member 470 has only to satisfy the following requirements: the fixing member 470 is adapted to be fastened to a concrete foundation with anchor bolts projecting from the concrete foundation; and at least the upper surface of the fixing member 470 is rectangular and flat so as to form a horizontal surface when the fixing member 470 is fastened to the concrete foundation.

9. Fourth Metal Shear Fitting

Figure 11:
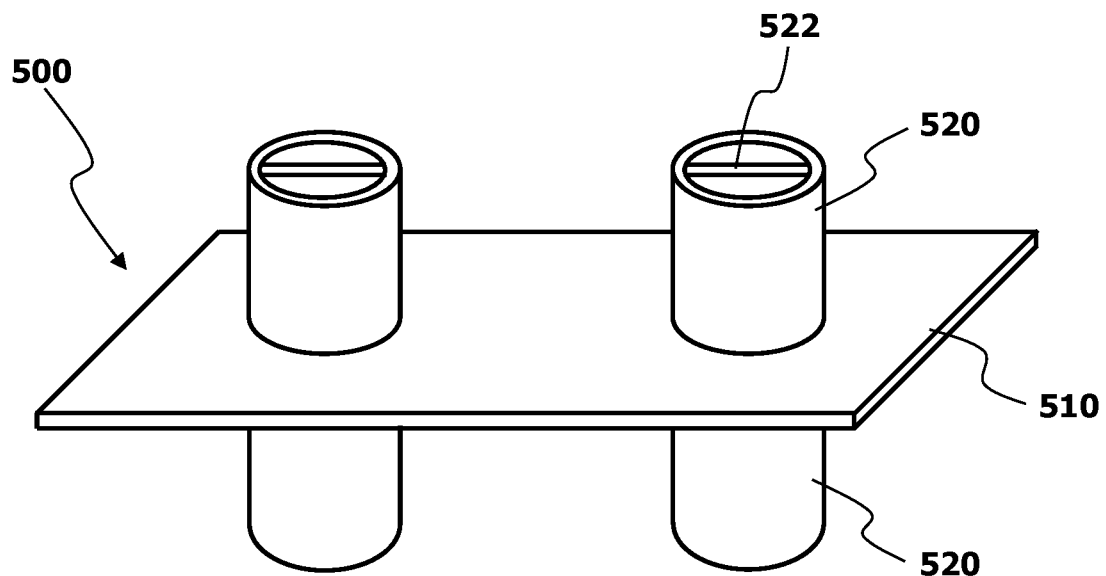
FIG. 11 is a perspective view of an example of a fourth metal shear fitting.

As shown in FIG. 11, a fourth metal shear fitting 500 has a base member 510 made of a rectangular metal plate, and four cylindrical members 520 each made of a metal cylinder. Note that the fourth metal shear fitting 500 may be an example of the metal joint.

The base member 510 is adapted to be disposed between a frame and a panel. Each cylindrical member 520 is adapted to be fitted into a circular hole formed in a groundsill, a beam, or a panel. The cylindrical members 520 are fixedly joined (fixed) onto the opposite surfaces of the base member 510 by welding or the like. Specifically, each two of the cylindrical members 520 are fixedly joined (fixed) on either of the opposite surfaces at two positions spaced apart from each other in the longitudinal direction of the base member 510. More specifically, each cylindrical member 520 is fixedly joined at a location that evenly divides the length, perpendicular to the longitudinal direction of the base member 510, of the plate surface of the base member 510 into two. In order to improve the strength of each cylindrical member 520, a reinforcing member 522 made of a rectangular metal plate may be fixedly joined to the inner periphery of the cylindrical member 520 by welding or the like, and integrated with the cylindrical member 520. The number of cylindrical members 520 fixedly joined to the opposite surfaces of the base member 510 is not limited to four, and may be two, six, or more (i.e., one, three, or more on each surface).

Next, description will be given of a structure formed by using various types of the metal fittings to fit and join a panel made of laminated veneer lumber, cross laminated timber, or the like to a gate-shaped or rectangular frame built by appropriately combining horizontal and vertical structural members.

First Embodiment

Figure 12:
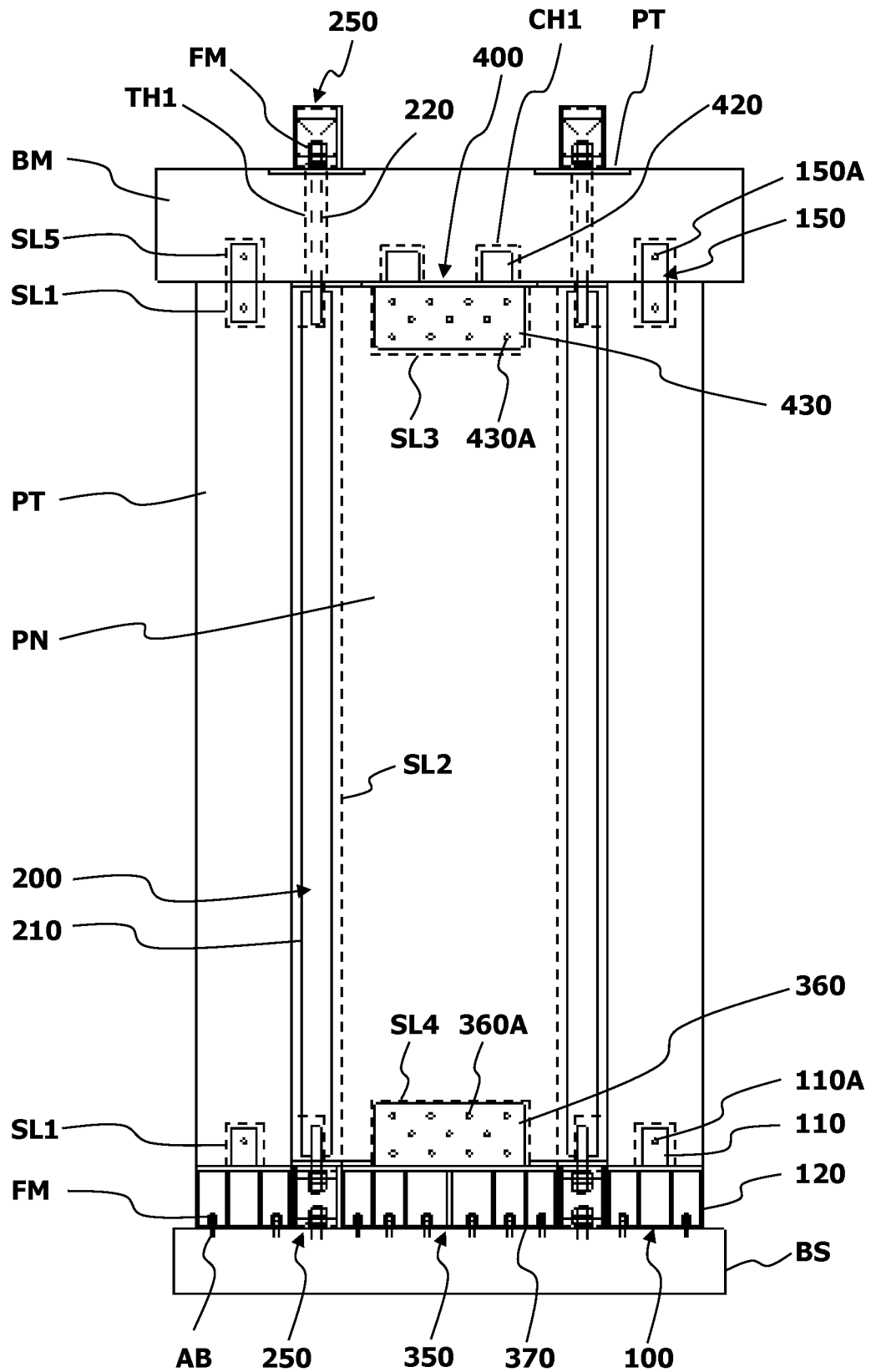
FIG. 12 is a front view of a first embodiment of a structure built using wooden building components.

FIG. 12 shows a first embodiment of a structure assumed to be employed in the first floor of a timber building.

In the structure according to the first embodiment, two metal vertical-member joints 100 and two metal connectors 150 are used to build a gate-shaped frame of two posts PT and one beam BM on a concrete foundation BS. Then, while a rectangular panel PN is fitted to the gate-shaped frame, two metal tie-down straps 200 and four metal box-shaped fittings 250, one first metal shear fitting 350, and one second metal shear fitting 400 are used to join the panel PN to the frame.

Each post PT has slits SL1 in the upper and lower surfaces. The slits SL1 are adapted to receive the metal connectors 150 and the joining members 110 of the metal vertical-member joints 100 fitted thereinto, and each formed at the center of the corresponding surface of the post PT so as to extend in the extending direction of the concrete foundation BS. In addition, each post PT has small holes (not shown) formed in one side surface thereof. Through the small holes, drift pins may be driven individually into the through holes 150A of the metal connectors 150 and the through holes 110A of the joining members 110.

The panel PN has slits SL2 formed in the right and left side surfaces. Each slit SL2 is adapted to receive the metal tie-down strap 200 fitted thereinto, and formed along the center line of the corresponding side surface so as to extend from the upper end to the lower end of the panel PN. More specifically, each slit SL2 of the panel PN has a stepped shape in which an upper end portion and a lower end portion of the slit SL2 have widths greater than that of an intermediate portion between these end portion, such that the bolt members 220 of the metal tie-down strap 200 may be fitted into these end portions of the slit SL2. In addition, the panel PN has slits SL3, SL4 respectively in the upper and lower surfaces. The slit SL3 is adapted to receive the joining member 430 of the second metal shear fitting 400 fitted thereinto and the slit SL4 is adapted to receive the joining member 360 of the first metal shear fitting 350 fitted thereinto. Each of the slits SL3, SL4 is formed at the center of the corresponding surface of the panel PN so as to extend in the longitudinal direction of this surface.

The beam BM has two slits SL5 and two circular holes CH1 at predetermined locations of the lower surface. Each slit SL5 is adapted to receive the metal connector 150 fitted thereinto, and extends in the axial direction of the beam BM. Each circular hole CH1 is adapted to receive the cylindrical member 420 of the second metal shear fitting 400 fitted thereinto, and extends in the axial direction of the beam BM. In addition, the beam BM has two through holes TH1 adapted to receive the shanks of the bolt members 220 of the metal tie-down straps 200 therethrough at predetermined locations. Each through hole TH1 penetrates through the beam BM from the upper surface to the lower surface.

The metal tie-down straps 200 are fitted into the slits SL2 of the panel PN and integrated with the panel PN with an adhesive or the like. Here, when the metal tie-down strap 200 has the through holes 210A in the base member 210, the metal tie-down straps 200 may be integrated with the panel PN with drift pins in place of an adhesive or the like. In this case, the drift pins may be driven from one surface of the panel PN such that the shanks of the drift pins are inserted through the through holes 210A. The second metal shear fitting 400 is integrated with the panel PN by fitting joining member 430 of the second metal shear fitting 400 into the slit SL3 of the panel PN, and driving drift pins from one surface of the panel PN so as to insert the shanks of the drift pins through the through holes 430A. Note that the metal tie-down straps 200 and the second metal shear fitting 400 may be integrated with the panel PN at a stage when the structure is built.

As shown in FIG. 12, using anchor bolts AB and fasteners FM, a metal vertical-member joint 100, a metal box-shaped fitting 250, a first metal shear fitting 350, a metal box-shaped fitting 250, and a metal vertical-member joint 100 are fastened to the upper surface of the concrete foundation BS, in this order from right to left of FIG. 12. Here, each anchor bolt AB projects upward from the upper surface of the concrete foundation BS, and each fastener FM, which includes a flat washer, a spring washer, and a double nut, is screwed onto the distal end of the corresponding anchor bolt AB. Specifically, the metal vertical-member joints 100, metal box-shaped fittings 250, and first metal shear fitting 350 are disposed on the upper surface of the concrete foundation BS with the shanks of the anchor bolts AB individually inserted through the through holes 122A, 250A, 372A, and then fastened to the concrete foundation BS by screwing the fasteners FM onto the shanks of the anchor bolts AB projecting from the bottom plates of these metal joints and fittings.

The joining member 110 of each metal vertical-member joint 100 is fitted into the slit SL1 formed in the lower surface of the corresponding post PT, so that the lower surfaces of the posts PT are joined to the metal vertical-member joints 100. In this event, to ensure secure joining of the posts PT to the metal vertical-member joints 100, a drift pin is driven from one side surface of each post PT such that the shank of the drift pin is inserted through the through hole 110A of the corresponding joining member 110.

To the metal box-shaped fittings 250 and first metal shear fitting 350, the lower surface of the panel PN integrally provided with the metal tie-down straps 200 is joined. Specifically, a lower end portion of each metal tie-down strap 200 is joined to the corresponding metal box-shaped fitting 250 by inserting the shank of one of the bolt members 220 of the metal tie-down strap 200 through the through holes 250A of the metal box-shaped fitting 250, and screwing a fastener FM onto the external thread 220A of the bolt member 220. To the first metal shear fitting 350, the lower surface of the panel PN is joined by fitting the joining member 360 of the first metal shear fitting 350 into the slit SL4 formed in the lower surface of the panel PN, and driving drift pins from one surface of the panel PN so as to insert the shanks of the drift pins through the through holes 360A.

To the upper surfaces of the panel PN and right and left posts PT, the lower surface of the beam BM is joined with the metal connectors 150 and the second metal shear fitting 400. Specifically, each metal connector 150 is fitted into both the slit SL1 formed in the upper surface of the corresponding post PT and the corresponding slit SL5 formed in the lower surface of the beam BM so as to extend across the slits SL1, SL5. Furthermore, drift pins are driven from one surfaces of the posts PT and beam BM such that the shanks of the drift pins are inserted through the through holes 150A of the metal connectors 150. In addition, the cylindrical members 420 of the second metal shear fitting 400 integrated with the panel PN are fitted into the circular holes CH1 of the beam BM. The shanks of the other bolt members 220 of the metal tie-down straps 200 integrated with the panel PN are inserted through the through holes TH1 of the beam BM. The portion, projecting from the upper surface of the beam BM, of each bolt member 220 is inserted through the through hole 250A formed in the bottom surface of the corresponding metal box-shaped fitting 250. Furthermore, a fastener FM is screwed onto the external thread 220A in the portion, projecting from the bottom plate of the metal box-shaped fitting 250, of the bolt member 220.

Additionally, in order to suppress digging of the metal box-shaped fittings 250 into the beam BM when the fasteners FM are tightened onto the external threads 220A, a plate (washer) PT, such as a rectangular metal plate, having a flat surface larger than that of the bottom plate of the metal box-shaped fitting 250 may be interposed between the beam BM and each metal box-shaped fitting 250. Furthermore, the means for fastening the metal tie-down straps 200 to the beam BM is not limited to using the metal box-shaped fittings 250, but may alternatively be using, for example, the plates PT alone or the metal spacers 300, each of which has a through hole only in the bottom plate.

The first embodiment of the structure provides the following effects. When, for example, a horizontal force due to an earthquake or a typhoon acts on the gate-shaped frame formed of two posts PT and one beam BM, the gate-shaped frame tends to deform into a parallelogram. However, while the gate-shaped frame is deforming, the posts PT come in contact with the side surfaces of the rectangular panel PN fitted in the gate-shaped frame, which can suppress such a deformation of the frame. Furthermore, in this event, a shear force in the axial direction of the beam BM acts between the upper surface of the panel PN and the beam BM, but such a shear force is received by the cylindrical members 420 of the second metal shear fitting 400 and an excessive deformation of the frame is prevented. Also, each cylindrical member 420 of the second metal shear fitting 400 and the corresponding circular hole CH1 of the beam BM are configured to be displaced relative to each other. Thus, when a vertical load acts on the gate-shaped frame, such a displacement prevents load transfer from the beam BM to the panel PN. This eliminates the need for the panel PN to support such a load, and facilitates the structural design of the gate-shaped frame.

It may be supposed that when the gate-shaped frame is about to deform into a parallelogram and comes in contact with the panel PN, such contact may cause an uplift behavior, i.e., a displacement between the parallel disposed concrete foundation BS and beam BM away from each other. However, in fact, since the beam BM is connected to the concrete foundation BS by the metal tie-down straps 200 integrated with the panel PN, this connection suppresses the relative displacement of the beam BM with respect to the concrete foundation BS, and thus can suppress uplift of the beam BM, i.e., a displacement between the parallel disposed concrete foundation BS and beam BM away from each other. Note that the present invention is not limited to an embodiment in which each metal tie-down strap 200 is adapted to connect the concrete foundation BS and the beam BM. Alternatively, the metal tie-down strap 200 may be adapted to connect other types of two parallel disposed structural bodies, such as a groundsill and a beam, a beam and another beam, or a post and another post.

Figure 13:
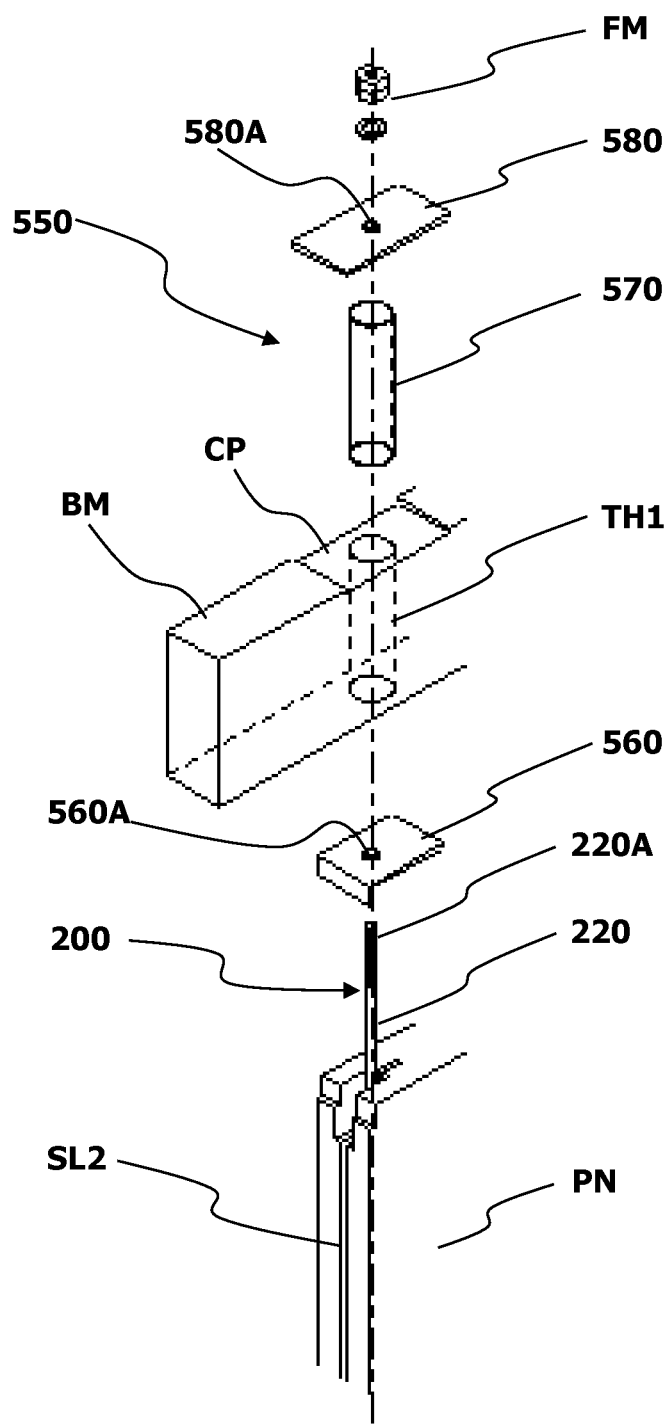
FIG. 13 is a perspective view of an example of a metal reinforcement fitting.

Here, as described above, when a horizontal force acts on the gate-shaped frame to deform the gate-shaped frame into a parallelogram, the displacement of the beam BM with respect to the concrete foundation BS is suppressed by the metal tie-down straps 200. However, in turn, this can possibly cause fittings on the upper surface of the beam BM, such as the metal box-shaped fittings 250, to dig into the beam BM. Accordingly, metal reinforcement fittings 550 as shown in FIG. 13 are used to suppress such digging of the metal box-shaped fittings 250 and/or the like into the beam BM.

Each metal reinforcement fitting 550 has a first plate member 560, a cylindrical member 570, a second plate member 580, and a fastener FM. Each of the first and second plate members 560, 570 is made of a metal plate having a rectangular shape in a plan view. The cylindrical member 570 is made of a metal cylinder. The first plate member 560 has a through hole 560A in the plate surface, and one end (one short-side end) of the first plate member 560 is bent down at 90°. The through hole 560A is adapted to receive the shank of one of the bolt members 220 of the metal tie-down strap 200 therethrough. Note that the first plate member 560 may have any other shape, such as a simple rectangular shape, a circular shape, or a polygonal shape. The entire length of the cylindrical member 570 is equal to the vertical dimension (height) of the beam BM. The second plate member 580 has a through hole 580A in the plate surface. The through hole 580A is adapted to receive the shank of one of the bolt members 220 of the metal tie-down strap 200.

Note that the second plate member 580 may have any other shape, such as a circular shape or a polygonal shape.

The first plate members 560 are disposed between the panel PN and the beam BM with the shanks of the bolt members 220 inserted through the through holes 560A. Here, each first plate member 560 has a down bent end, as described above. Thus, when the first plate member 560 is disposed between the panel PN and the beam BM, this bend is engaged with the shoulder of the panel PN, and suppresses rotation of the first plate member 560 with respect to the panel PN. The cylindrical members 570 are fitted into the through holes TH1 of the beam BM, and the shanks of the bolt members 220 are inserted through the interiors of the cylindrical members 570. In addition, the second plate members 580 are disposed on the upper surface of the beam BM with the portions, projecting upward from the cylindrical members 570, of the shanks of the bolt members 220 inserted through the through holes 580A. Here, in order to suppress rotation of the second plate members 580 with respect to the beam BM, rectangular recesses CP may be formed in the upper surface of the beam BM so that the second plate members 580 may be fitted into the recesses CP. After that, a fastener FM including, for example, a flat washer, a spring washer, and a double nut, is screwed onto the external thread 220A in each of the portions, projecting from the second plate members 580, of the bolt members 220. In the case in which the first plate member 560 has a simple rectangular shape, rectangular recesses (not shown) may be formed in the lower surface of the beam BM so that the first plate members 560 may be fitted into the recesses to suppress rotation of the first plate members 560.

Using the metal reinforcement fittings 550 as described above allows the first plate members 560, the cylindrical members 570, and the second plate members 580 to reinforce the portions of the beam BM where the through holes TH1 are formed. Thus, even when the force of fastening the metal tie-down straps 200 acts on the upper surface of the beam BM, digging of the fasteners FM into the beam BM can be suppressed.

In addition, using the metal reinforcement fittings 550 as described above can also suppress digging of the metal box-shaped fittings 250 and/or the like into the beam BM when the portions, projecting from the second plate members 580, of the bolt members 220 are further fastened with the metal box-shaped fittings 250 and/or the like. Note that application of the metal reinforcement fitting 550 is not limited to the structure shown in FIG. 12, but the metal reinforcement fitting 550 may also be used in other structures. Furthermore, the metal reinforcement fitting 550 may be used not only in beams BM but also in other wooden building components such as posts PT.

Figure 14:
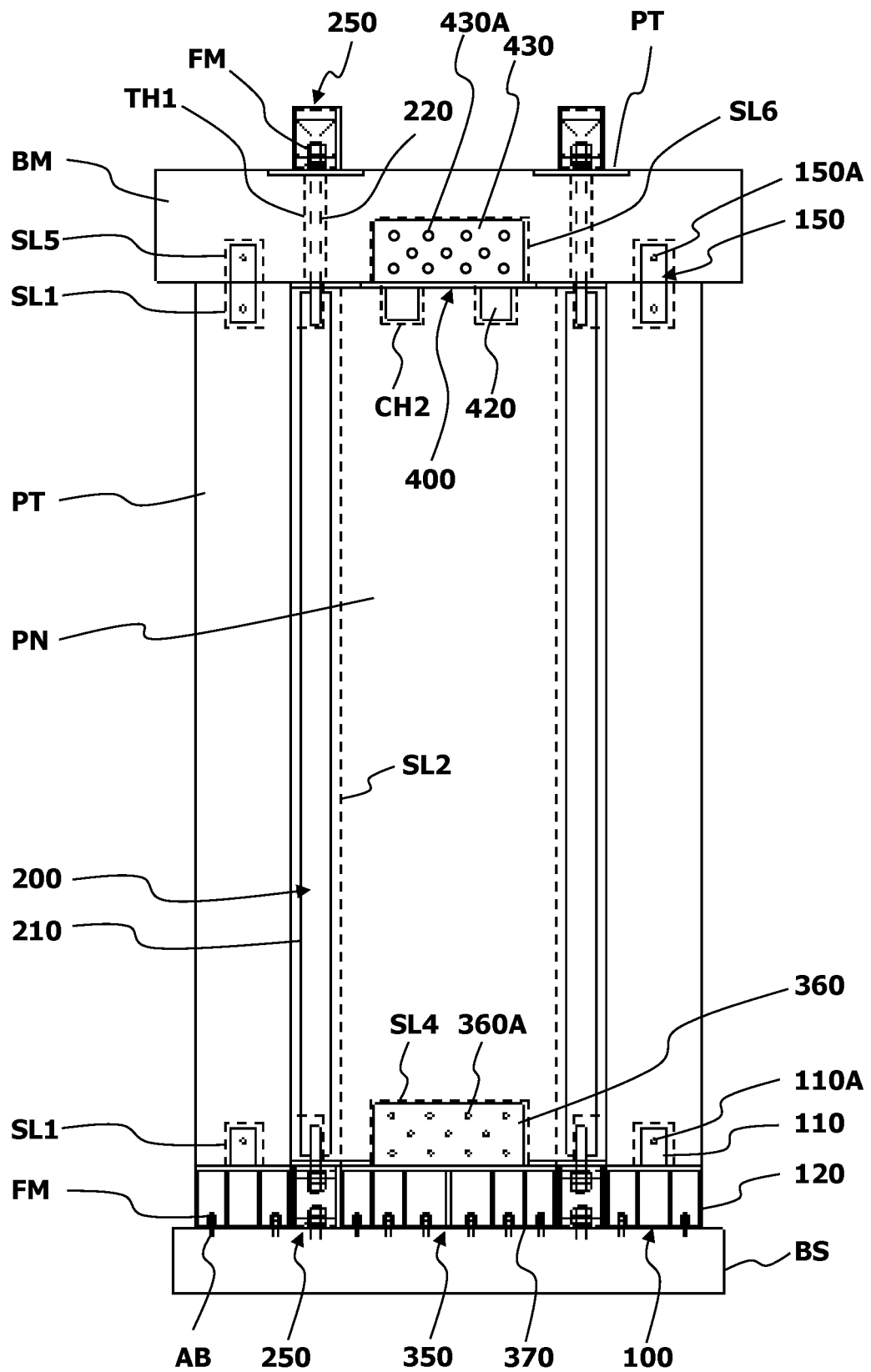
FIG. 14 is a front view of a first modification of the first embodiment.

Alternatively, the second metal shear fitting 400 used to join the upper surface of the panel PN and the lower surface of the beam BM may be disposed as shown in FIG. 14. Specifically, instead of the circular holes CH1, a slit SL6 adapted to receive the joining member 430 of the second metal shear fitting 400 fitted thereinto is formed in the lower surface of the beam BM. Furthermore, instead of the slit SL3, two circular holes CH2 each adapted to receive the cylindrical member 420 of the second metal shear fitting 400 fitted thereinto are formed in the upper surface of the panel PN.

The joining member 430 of the second metal shear fitting 400 is fitted into the slit SL6 of the beam BM, and drift pins are driven from one surface of the beam BM such that the shanks of the drift pins are inserted through the through holes 430A of the joining member 430. Thereby, the second metal shear fitting 400 is integrated with the beam BM. The cylindrical members 420 of the second metal shear fitting 400 are fitted into the circular holes CH2 of the panel PN that are located below the cylindrical members 420, thereby receiving a shear fore acted on the panel PN. The operational advantages and effects of this structure are the same as those of the example structure described above, and thus, are not described here again (the same applies below).

Figure 15:
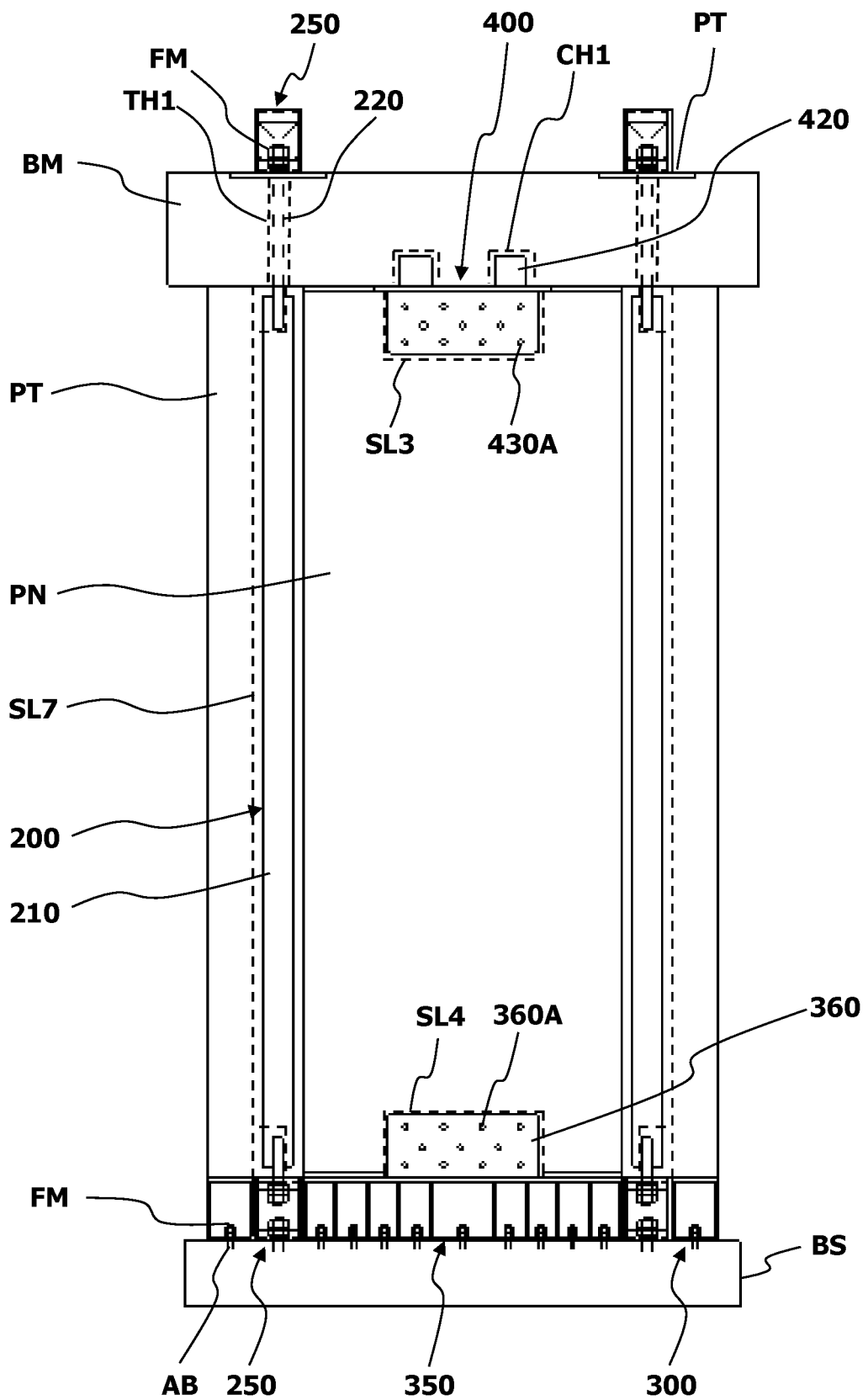
FIG. 15 is a front view of a second modification of the first embodiment.

Note that the present embodiment is not limited to an example in which the metal tie-down straps 200 are integrated with the panel PN. Alternatively, the metal tie-down straps 200 may be integrated with the posts PT, as shown in FIG. 15. Specifically, a stepped slit SL7 adapted to receive the metal tie-down strap 200 fitted thereinto is formed in one side surface of each post PT so as to extend over the entire length of the post PT. Furthermore, the metal tie-down straps 200 are fitted into the slits SL7 of the posts PT and integrated with the posts PT with, for example, an adhesive or drift pins.

In this case, the lower surface of each post PT is divided into two: a projecting portion fitted with the metal tie-down strap 200, and a flat portion not fitted with the metal tie-down strap 200. For this reason, in place of the metal vertical-member joint 100, the metal box-shaped fitting 250 and metal spacer 300 are used to support the lower surface of each post PT. Specifically, the flat lower-surface portion of each post PT is supported by the metal spacer 300, and the projecting lower-surface portion of the post PT is fastened to the concrete foundation BS with the metal box-shaped fitting 250. Here, the metal spacer 300 may be fastened to the concrete foundation BS through the same procedure as the metal box-shaped fitting 250 is fastened to the concrete foundation BS. Thus, the description thereof is omitted here (the same applies below). Note that the flat lower-surface portion of each post PT may be supported by the metal box-shaped fitting 250 instead of the metal spacer 300.

In this method, the metal tie-down straps 200 may be embedded in the posts PT, and thus the outer peripheral surface of each post PT may remain flat. Thus, by, for example, covering the four side surfaces defining the transverse cross section of the post PT with, for example, gypsum board with superior fire resistance, and then further covering this gypsum board with a wood covering material, it is possible to modify the post PT to be a building component with good appearance and fire resistance. In addition, in this method, the upper surface of each post PT is joined to the lower surface of the beam BM by the metal tie-down strap 200 integrated with the post PT. Thus, this method eliminates the need for the metal connectors 150, thus allowing for omitting the process of forming the slits SL1 in the posts PT and forming the slits SL5 in the beam BM from the building process.

Figure 16:
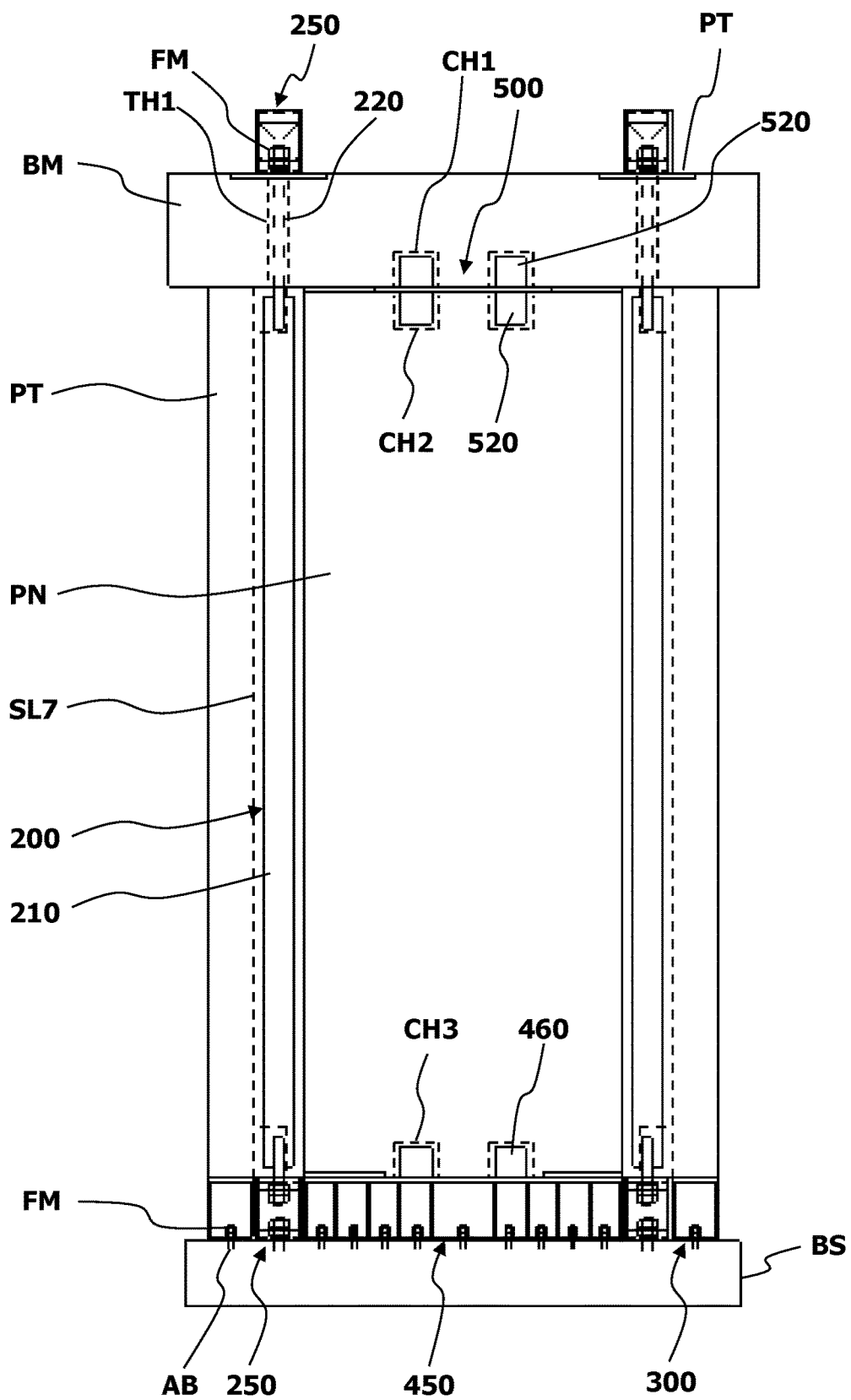
FIG. 16 is a front view of a third modification of the first embodiment.

Furthermore, as shown in FIG. 16, as the metal joint for joining the lower surface of the panel PN to a concrete foundation BS, the third metal shear fitting 450 may be used in place of the first metal shear fitting 350. In this case, instead of the slit SL4, two circular holes CH3, each adapted to receive the cylindrical member 460 of the third metal shear fitting 450 fitted thereinto, are formed in the lower surface of the panel PN. Furthermore, the lower surface of the panel PN is joined to the concrete foundation BS by fitting the circular holes CH3 of the panel PN to the cylindrical members 460 of the third metal shear fitting 450. In this case, the third metal shear fitting 450 can receive not only a vertical load of the panel PN, but also a horizontal force to move the panel PN in the horizontal direction.

Furthermore, as shown in FIG. 16, as the metal joint for joining the upper surface of the panel PN to the lower surface of the beam BM, the fourth metal shear fitting 500 may be used in place of the second metal shear fitting 400. In this case, instead of the slit SL3, two circular holes CH2, each adapted to receive the cylindrical member 520 of the fourth metal shear fitting 500 fitted thereinto, are formed in the upper surface of the panel PN. Furthermore, the upper surface of the panel PN is joined to the lower surface of the beam BM by fitting the circular holes CH2 formed in the upper surface of the panel PN to the cylindrical members 520 of the fourth metal shear fitting 500.

Second Embodiment

Figure 17:
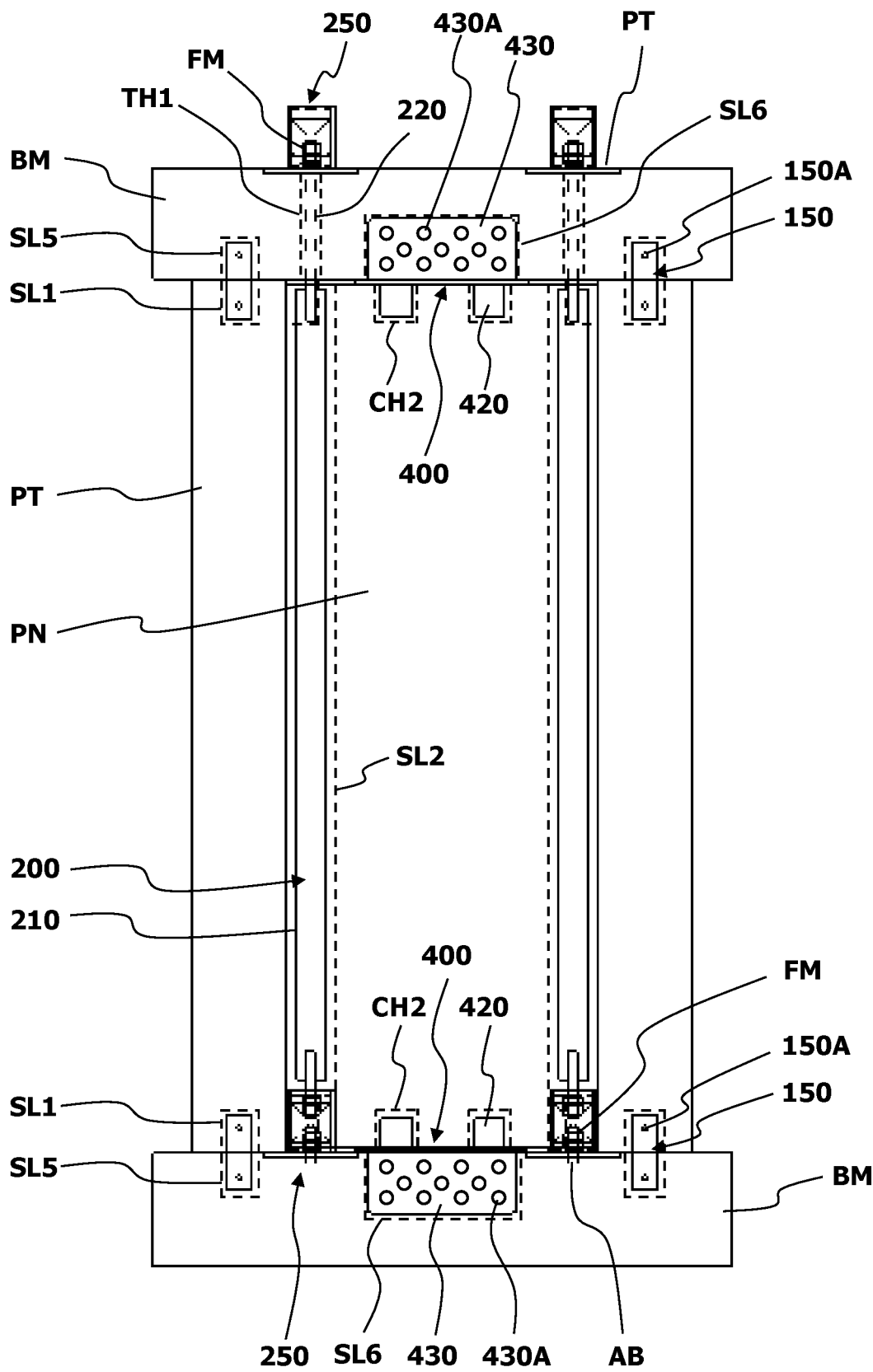
FIG. 17 is a front view of a second embodiment of a structure built using wooden building components.

FIG. 17 shows a second embodiment of a structure assumed to be employed in the second floor of a timber building.

In the structure according to the second embodiment, four metal connectors 150 are used to build a rectangular frame of two beams BM and two posts PT. Then, while a rectangular panel PN is fitted to the rectangular frame, two metal tie-down straps 200 and four metal box-shaped fittings 250, and two second metal shear fittings 400 are used to join the panel PN to the frame.

Each post PT has slits SL1 in the upper and lower surfaces. Each slit SL1 is adapted to receive the metal connector 150 fitted thereinto, and formed at the center of the corresponding surface of the post PT so as to extend in the axial direction of the beam BM. In addition, each post PT has small holes (not shown) formed in one side surface thereof. Through the small holes, drift pins may be driven individually into the through holes 150A of the metal connectors 150. The lower beam BM has slits SL5 and a slit SL6 at predetermined locations of the upper surface. Similarly, the upper beam BM has slits SL5 and a slit SL6 at predetermined locations of the lower surface. Each slit SL5 is adapted to receive the metal connector 150 fitted thereinto, and the slit SL6 is adapted to receive the joining member 430 of the second metal shear fitting 400 fitted thereinto. Furthermore, as in the first embodiment, the metal tie-down straps 200 are integrally provided to right and left side surfaces of the panel PN. In addition, two circular holes CH2 adapted to receive the cylindrical members 420 of the second metal shear fitting 400 fitted thereinto are formed in each of the upper and lower surfaces of the panel PN.

Using anchor bolts AB and fasteners FM, two metal box-shaped fittings 250 are fastened to the upper surface of the lower beam BM. Here, each anchor bolt AB projects upward from the upper surface of the lower beam BM, and each fastener FM, which includes a flat washer, a spring washer, and a double nut, is screwed onto the distal end of the corresponding anchor bolt AB. Specifically, the metal box-shaped fittings 250 are disposed on the upper surface of the beam BM with the shanks of the anchor bolts AB inserted through the through holes 250A, and then fastened to the beam BM by screwing the fasteners FM onto the shanks of the anchor bolts AB projecting from the bottom plates of these metal fittings.

The upper surface of the lower beam BM is joined to the lower surfaces of the posts PT by fitting the metal connector 150 into both the slit SL1 of each post PT and the corresponding slit SL5 of the beam BM. In this event, to ensure secure joining of the posts PT to the beam BM, drift pins are driven from one side surfaces of the beam BM and each post PT such that the shanks of the drift pins are inserted through the through holes 150A of the metal connectors 150.

To the upper surfaces of the metal box-shaped fittings 250 and lower beam BM, the lower surface of the panel PN integrally provided with the metal tie-down straps 200 is joined. Specifically, a lower end portion of each metal tie-down strap 200 is joined to the corresponding metal box-shaped fitting 250 by inserting the shank of one of the bolt members 220 of the metal tie-down strap 200 through the through holes 250A of the metal box-shaped fitting 250, and screwing a fastener FM onto the external thread 220A of the bolt member 220. Here, to ensure that the metal box-shaped fittings 250 do not interfere with the opposite lower corners of the panel PN, rectangular notches are formed at these lower corners of the panel PN. The second metal shear fitting 400 is joined to the upper surface of the lower beam BM by fitting the joining member 430 of the second metal shear fitting 400 into the slit SL6 of this beam BM. In this event, to ensure secure joining of the second metal shear fitting 400 to the beam BM, drift pins are driven from one side surface of the beam BM such that the shanks of the drift pins are inserted through the through holes 430A of the joining member 430. To the second metal shear fitting 400, the lower end of the panel PN is joined by fitting the cylindrical members 420 of the second metal shear fitting 400 into the circular holes CH2 formed in the lower surface of the panel PN.

To the upper surfaces of the panel PN and right and left posts PT, the lower surface of the upper beam BM is joined with the metal connectors 150 and the second metal shear fitting 400. Specifically, each metal connector 150 is fitted into both the slit SL1 formed in the upper surface of the corresponding post PT and the corresponding slit SL5 formed in the lower surface of the beam BM so as to extend across the slits SL1, SL5. Furthermore, drift pins are driven from one surfaces of the posts PT and beam BM such that the shanks of the drift pins are inserted through the through holes 150A of the metal connectors 150. In addition, the cylindrical members 420 of the second metal shear fitting 400 integrated with the beam BM are fitted into the circular holes CH2 of the panel PN. The shanks of the other bolt members 220 of the metal tie-down straps 200 integrated with the panel PN are inserted through the through holes TH1 of the beam BM. The portion, projecting from the upper surface of the beam BM, of each bolt member 220 is inserted through the through hole 250A formed in the bottom surface of the corresponding metal box-shaped fitting 250. Furthermore, a fastener FM is screwed onto the external thread 220A in the portion, projecting from the bottom plate of the metal box-shaped fitting 250, of the bolt member 220.

Additionally, in order to suppress digging of the metal box-shaped fittings 250 into the beam BM when the fasteners FM are tightened onto the external threads 220A, a plate (washer) PT, such as a rectangular metal plate, having a flat surface larger than that of the bottom plate of the metal box-shaped fitting 250 may be interposed between the beam BM and each metal box-shaped fitting 250. Furthermore, the means for fastening the metal tie-down straps 200 to the beam BM is not limited to using the metal box-shaped fittings 250, but may alternatively be using, for example, the plates PT alone or the metal spacers 300, each of which has a through hole only in the bottom plate. In addition, the metal reinforcement fittings 550 may be used to reinforce the through holes TH1 of the beam BM, as in the first embodiment.

The second embodiment of the structure provides the following effects. When, for example, a horizontal force due to an earthquake or a typhoon acts on the rectangular frame formed of two posts PT and two beams BM, the rectangular frame tends to deform into a parallelogram. However, while the rectangular frame is deforming, the posts PT come in contact with the side surfaces of the rectangular panel PN fitted in the rectangular frame, which can suppress such a deformation of the frame. Furthermore, in this event, a shear force in the axial direction of the beam BM acts between the upper surface of the panel PN and the beam BM, but such a shear force is received by the cylindrical members 420 of the second metal shear fittings 400 and an excessive deformation of the frame is prevented. Also, each cylindrical member 420 of the second metal shear fittings 400 and the corresponding circular hole CH2 of the panel PN are configured to be displaced relative to each other. Thus, when a vertical load acts on the rectangular frame, such a displacement prevents load transfer from the beams BM to the panel PN. This eliminates the need for the panel PN to support such a load, and facilitates the structural design of the rectangular frame.

Figure 18:
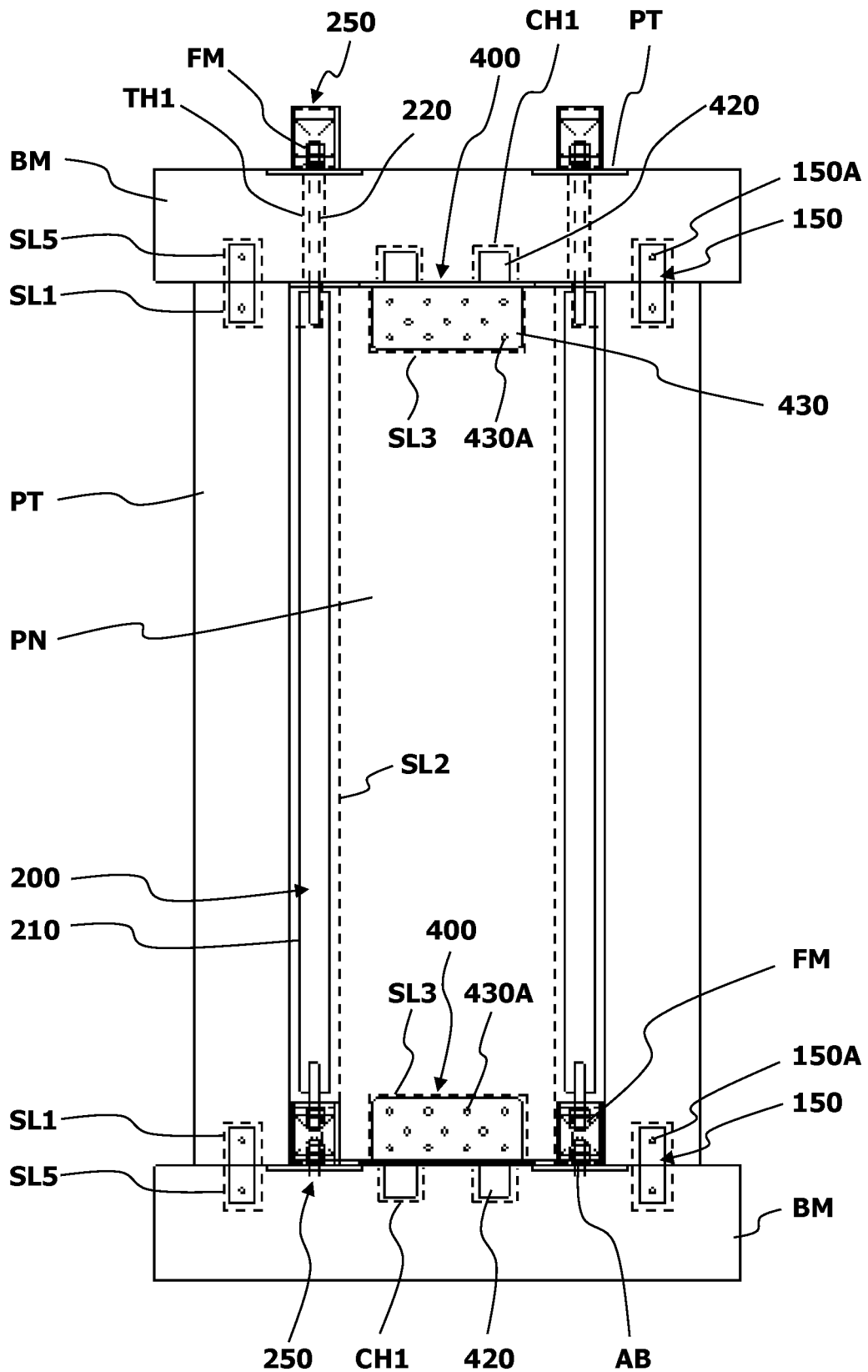
FIG. 18 is a front view of a first modification of the second embodiment.
Figure 19:
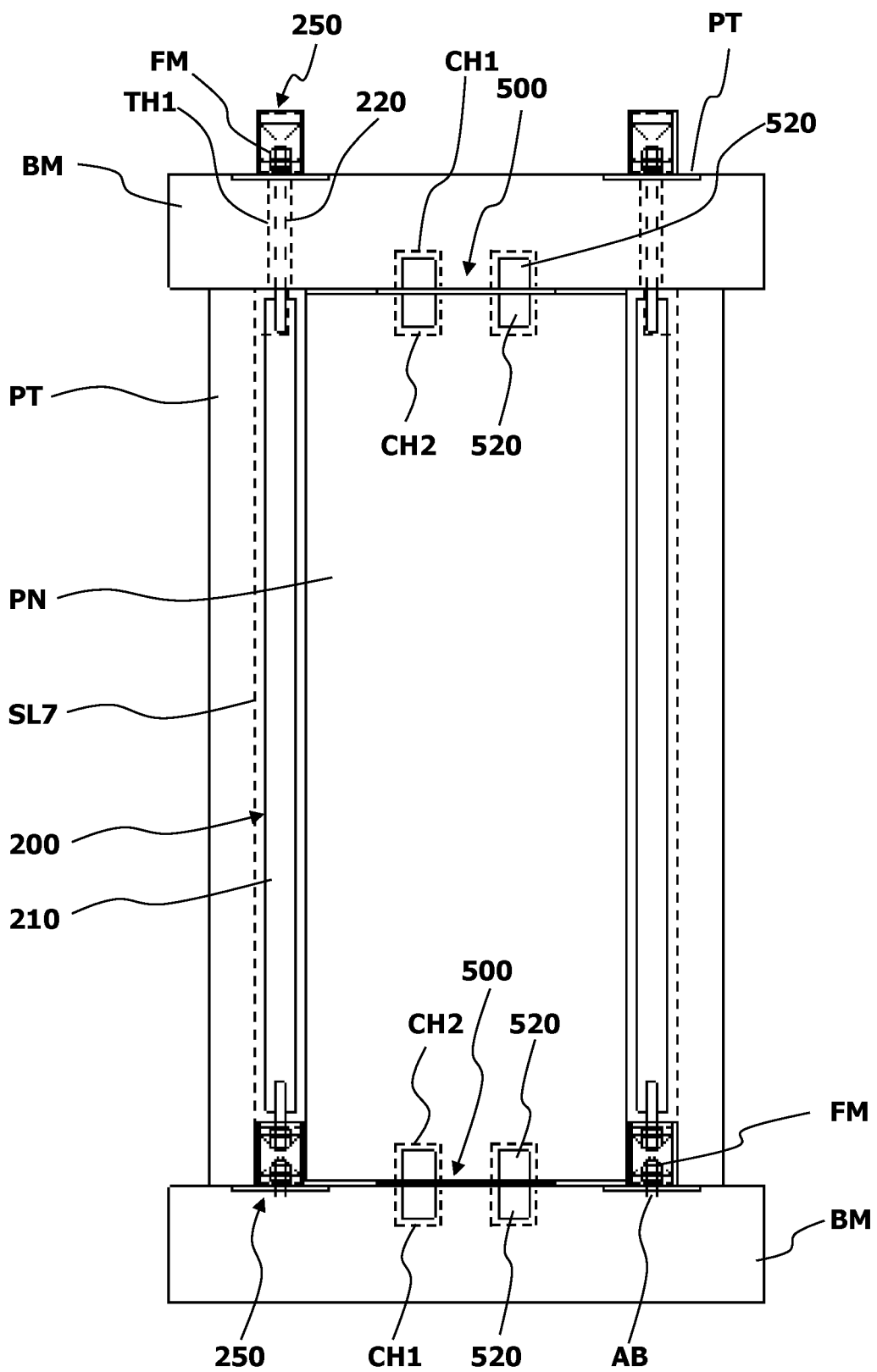
FIG. 19 is a front view of a second modification of the second embodiment.

In the second embodiment as well, as shown in FIG. 18, the vertical orientation of each second metal shear fitting 400 may be inverted. Furthermore, as shown in FIG. 19, as the metal joints for joining the panel PN to the beams BM, the fourth metal shear fittings 500 may be used in place of the second metal shear fittings 400. In this case, the four cylindrical members 520 of each fourth metal shear fitting 500 may be fitted into the circular holes CH1 of the corresponding beam BM and the corresponding circular holes CH2 of the panel PN. Also, the present embodiment is not limited to an example in which the metal tie-down straps 200 are integrated with the panel PN. Alternatively, the metal tie-down straps 200 may be integrated with the posts PT, as shown in FIG. 19.

The first and second embodiments are not limited to an example in which the metal joints for joining a panel PN to a gate-shaped or rectangular frame are disposed in the upper and lower surfaces of the panel PN. Alternatively, such metal joints may be disposed in the right and left side surfaces of the panel PN.

In the first embodiment, the various types of metal fittings as used in the second embodiment may be used to build a rectangular frame by fastening a groundsill, which serve as a horizontal structural member, to the upper surface of the concrete foundation BS. Furthermore, one or more of the technical features described in the first embodiment may be appropriately combined or substituted with one or more of the technical features described in the second embodiment.

REFERENCE SYMBOL LIST

400 Second metal shear fitting (Metal joint)
410 Base member
420 Cylindrical member
422 Reinforcing member
430 Joining member
430A Through hole
450 Third metal shear fitting (Metal joint)
460 Cylindrical member
462 Reinforcing member
470 Fixing member
500 Fourth metal shear fitting (Metal joint)
510 Base member
520 Cylindrical member
522 Reinforcing member
BM Beam (Horizontal structural member)
PT Post (Vertical structural member)
PN Panel
BS Concrete foundation
CH1, CH2, CH3 Circular hole
SL3, SL6 Slit

The invention claimed is:
1. A panel joining method, comprising:
integrating a metal joint with a rectangular panel by fitting the metal joint into the panel, the panel being a flat piece of wood with straight sides that forms part of a wall; and
fitting the metal joint integrated with the panel into a frame built by appropriately combining a horizontal structural member and a vertical structural member, the metal joint comprising:
a base member made of a rectangular metal plate and adapted to be disposed between the frame and the panel; and
cylindrical members each made of a metal cylinder, the cylindrical members being fixed onto opposite surfaces of the base member and fitted into circular holes formed in the frame and the panel in a manner that the cylindrical members are able to be displaced relative to the circular holes, each of the circular holes perpendicularly extending inward from a surface of the frame and the panel.

2. The panel joining method according to claim 1, wherein a reinforcing member made of a rectangular metal plate is joined to an inner periphery of each of the cylindrical members and integrated with the cylindrical member.

3. A panel joining method, comprising:
integrating a metal joint with a rectangular panel by fitting the metal joint into the panel, the panel being a flat piece of wood with straight sides that forms part of a wall; and
fitting the metal joint integrated with the panel into a frame built by appropriately combining a horizontal structural member and a vertical structural member, the metal joint comprising:
a base member made of a rectangular metal plate and adapted to be disposed between the frame and the panel;
a cylindrical member made of a metal cylinder and fixed onto one surface of the base member, the cylindrical member being fitted into a circular hole formed in either one of the frame and the panel in a manner that the cylindrical member is able to be displaced relative to the circular hole, the circular hole perpendicularly extending inward from a surface of the frame or the panel; and
a joining member made of a rectangular metal plate and fixed onto the other surface of the base member, the joining member being adapted to be fitted into a slit formed in the other of the frame and the panel.

4. The panel joining method according to claim 3, wherein the joining member has a plurality of through holes adapted to receive shanks of drift pins therethrough.

5. The panel joining method according to claim 3, wherein a reinforcing member made of a rectangular metal plate is joined to an inner periphery of the cylindrical member and integrated with the cylindrical member.

6. A panel joining method, comprising:
integrating a metal joint with a rectangular panel by fitting the metal joint into the panel, the panel being a flat piece of wood with straight sides that forms part of a wall; and
fitting the metal joint integrated with the panel into a frame built on a concrete foundation by appropriately combining a horizontal structural member and a vertical structural member, the metal joint comprising:

a metal fixing member adapted to be fastened to the concrete foundation, wherein at least an upper surface of the metal fixing member is rectangular and flat so as to form a horizontal surface when the fixing member is fastened to the concrete foundation; and a cylindrical member made of a metal cylinder and fixed onto the upper surface of the fixing member, the cylindrical member being fitted into a circular hole formed in the panel in a manner that the cylindrical member is able to be displaced relative to the circular hole, the circular hole perpendicularly extending inward from a surface of the panel.

7. The panel joining method according to claim 6, wherein a reinforcing member made of a rectangular metal plate is joined to an inner periphery of the cylindrical member and integrated with the cylindrical member.

\* \* \* \* \*